(12) United States Patent
Pawar et al.

(10) Patent No.: US 9,408,081 B1
(45) Date of Patent: Aug. 2, 2016

(54) ASSIGNING WIRELESS COVERAGE AREA IDENTIFIERS BASED ON TRACKING AREA GROUPS

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/265,296

(22) Filed: Apr. 29, 2014

(51) Int. Cl.
*H04W 36/00* (2009.01)
*H04W 16/00* (2009.01)

(52) U.S. Cl.
CPC ................................. *H04W 16/00* (2013.01)

(58) Field of Classification Search
CPC .................................................... H04W 16/00
See application file for complete search history.

(56) References Cited

U.S. PATENT DOCUMENTS

| 8,537,751 | B2 | 9/2013 | Nylander et al. | |
|---|---|---|---|---|
| 2010/0029298 | A1* | 2/2010 | Iwamura | H04J 11/0069 455/456.1 |
| 2010/0297955 | A1 | 11/2010 | Marinier et al. | |
| 2013/0034081 | A1* | 2/2013 | Ban et al. | 370/331 |
| 2013/0337797 | A1 | 12/2013 | Ban et al. | |
| 2014/0057634 | A1* | 2/2014 | Chang et al. | 455/437 |
| 2014/0204809 | A1* | 7/2014 | Kim et al. | 370/280 |
| 2014/0301371 | A1* | 10/2014 | Maeda | H04W 36/0011 370/331 |

FOREIGN PATENT DOCUMENTS

| WO | 2010/083659 | 7/2010 |
|---|---|---|
| WO | 2011/023234 | 3/2011 |

OTHER PUBLICATIONS

Pawar et al., U.S. Appl. No. 14/175,027, filed Feb. 7, 2014, 37 pages.

* cited by examiner

*Primary Examiner* — Tammy Pham
*Assistant Examiner* — Idowu O Osifade (57) ABSTRACT

Data identifying a plurality of wireless coverage areas in a region may be obtained. The data may identify geographic locations of the wireless coverage areas. Possibly based on the data, the wireless coverage areas may be arranged into a plurality of mutually exclusive tracking area groups. Each of the tracking area groups may include multiple wireless coverage areas and may be identified by respective unique tracking area identifiers. The tracking area groups may form a geographically-defined sequence across the region. A numerical sequence of wireless coverage area identifiers may be assigned to the wireless coverage areas in the region, one wireless coverage area identifier per wireless coverage area. The wireless coverage areas of the tracking area groups may be provisioned to use the assigned wireless coverage area identifiers.

20 Claims, 7 Drawing Sheets

| Tracking Area Group | Tracking Area Identifier | PCIs |
|---|---|---|
| Group 1 | 19840 | 0-44 |
| Group 1 | 19841 | 45-89 |
| Group 1 | 19842 | 90-134 |
| Group 1 | 19843 | 135-179 |
| Group 1 | 19844 | 180-224 |
| Group 1 | 19845 | 225-269 |
| Group 1 | 19846 | 270-314 |
| Group 1 | 19847 | 315-359 |
| Group 1 | 19848 | 360-404 |
| Group 1 | 19849 | 405-449 |
| Group 1 | 19850 | 450-503 |
| Group 2 | 19851 | 0-44 |
| Group 2 | 19852 | 45-89 |
| Group 2 | 19853 | 90-134 |
| Group 2 | 19854 | 135-179 |
| Group 2 | 19855 | 180-224 |
| Group 2 | 19856 | 225-269 |
| Group 2 | 19857 | 270-314 |
| Group 2 | 19858 | 315-359 |
| Group 2 | 19859 | 360-404 |
| Group 2 | 19860 | 405-449 |
| Group 2 | 19861 | 450-503 |

| Tracking Area Group | Tracking Area Identifier | PCIs |
|---|---|---|
| Group 1 | 19840 | 0-44 |
| Group 1 | 19841 | 45-89 |
| Group 1 | 19842 | 90-134 |
| Group 1 | 19843 | 135-179 |
| Group 1 | 19844 | 180-224 |
| Group 1 | 19845 | 225-269 |
| Group 1 | 19846 | 270-314 |
| Group 1 | 19847 | 315-359 |
| Group 1 | 19848 | 360-404 |
| Group 1 | 19849 | 405-449 |
| Group 1 | 19850 | 450-503 |
| Group 2 | 19851 | 0-44 |
| Group 2 | 19852 | 45-89 |
| Group 2 | 19853 | 90-134 |
| Group 2 | 19854 | 135-179 |
| Group 2 | 19855 | 180-224 |
| Group 2 | 19856 | 225-269 |
| Group 2 | 19857 | 270-314 |
| Group 2 | 19858 | 315-359 |
| Group 2 | 19859 | 360-404 |
| Group 2 | 19860 | 405-449 |
| Group 2 | 19861 | 450-503 |

ASSIGNING WIRELESS COVERAGE AREA IDENTIFIERS BASED ON TRACKING AREA GROUPS

BACKGROUND

When a wireless communication device (WCD) is handed over from a source wireless coverage area to a target wireless coverage area, it is desirable for the WCD and the radio access network (RAN) to know which one of possibly many nearby wireless coverage areas is the target. Therefore, wireless coverage areas may be assigned identifiers so that they can be distinguished from one another. These identifiers, however, may be selected from a limited space. This, and the increasing density of wireless coverage, can lead to one or more wireless coverage areas in the vicinity of the target wireless coverage area to have the same identifier. In such a circumstance, the WCD could be handed over to the wrong wireless coverage area.

OVERVIEW

In order to improve the accuracy of WCD handovers in a radio access network, among other possible advantages, wireless coverage area identifiers may be assigned to geographically-defined areas such that the same wireless coverage area identifier is not assigned to any two geographically-adjacent areas. In this way, the risk of an erroneously targeted handover is reduced.

Some types of wireless networks, such as those operating in accordance with Long-Term Evolution (LTE), may use the concept of a tracking area to improve the paging of idle WCDs. Each tracking area may be a group of geographically proximate wireless coverage areas. In some cases, the wireless coverage areas within a tracking area may provide contiguous wireless coverage in a particular geographic region.

When a WCD is idle (i.e., the WCD is not assigned or is not using traffic channel resources), the WCD be associated with a primary wireless coverage area on which the WCD listens for paging messages. As the WCD moves about, the WCD may be handed over to a new primary wireless coverage area. In order to potentially reduce signaling traffic load on the RAN, the WCD might only inform the RAN of these idle-mode handovers when the WCD is handed over from a source wireless coverage area in one tracking area to a target wireless coverage area in a different tracking area.

The RAN, therefore, might not be aware of the WCD's primary wireless coverage area, but should be aware of the WCD's tracking area. If there is an incoming call or incoming data for the WCD, the RAN may page the WCD via one or more wireless coverage areas in the tracking area. The RAN may continue paging the WCD until the WCD responds or the RAN gives up the paging procedure. In some cases, a WCD may be associated with more than one tracking area and the RAN may page the WCD via each of these tracking areas.

Since tracking areas are geographically-defined, it may be beneficial to assign disjoint subsets of the wireless coverage area identifier space to geographically-adjacent tracking areas. In this way, it would be unlikely that a WCD would be within range of two wireless coverage areas with the same identifier.

Accordingly, in a first example embodiment, data identifying a plurality of wireless coverage areas in a region may be obtained. The data may identify geographic locations of the wireless coverage areas. Possibly based on the data, the wireless coverage areas may be arranged into a plurality of mutually exclusive tracking area groups. Each of the tracking area groups may include multiple wireless coverage areas and may be identified by respective unique tracking area identifiers. The tracking area groups, as indexed by their identifiers, may form a geographically-defined sequence across the region.

A numerical sequence of wireless coverage area identifiers may be assigned to the wireless coverage areas in the region, one wireless coverage area identifier per wireless coverage area. Assigning the numerical sequence of wireless coverage area identifiers may include (i) assigning numerically sequential sub-sequences of the wireless coverage area identifiers to a first proper subset of the tracking area groups taken in order of the geographically-defined sequence, and (ii) after exhausting assignment of the numerically sequential sub-sequences of the wireless coverage area identifiers, assigning the numerically sequential sub-sequences of the wireless coverage area identifiers to a second proper subset of the tracking area groups taken in continued order of the geographically-defined sequence. The wireless coverage areas of the tracking area groups may be provisioned to use the assigned wireless coverage area identifiers.

In a second example embodiment, a geographically-defined sequence of two or more tracking area groups may be obtained. The tracking area groups may each include two or more base stations, and each base station may define one or more wireless coverage areas. Wireless coverage area identifiers may be assigned to the wireless coverage areas in each tracking area group. Disjoint sub-sequences of the wireless coverage area identifiers may be assigned to each geographically-adjacent pair of tracking area groups. The wireless coverage areas of the tracking area groups may be provisioned to use the assigned wireless coverage area identifiers.

A third example embodiment may include a non-transitory, computer-readable storage medium, having stored thereon program instructions that, upon execution by a computing device, cause the computing device to perform operations in accordance with the first and/or second example embodiments.

A fourth example embodiment may include a computing device, including at least a processor and data storage. The data storage may include program instructions that, when executed by the processor, cause the computing device to perform operations in accordance with the first and/or second example embodiments.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Wireless Communication System

Figure 1:
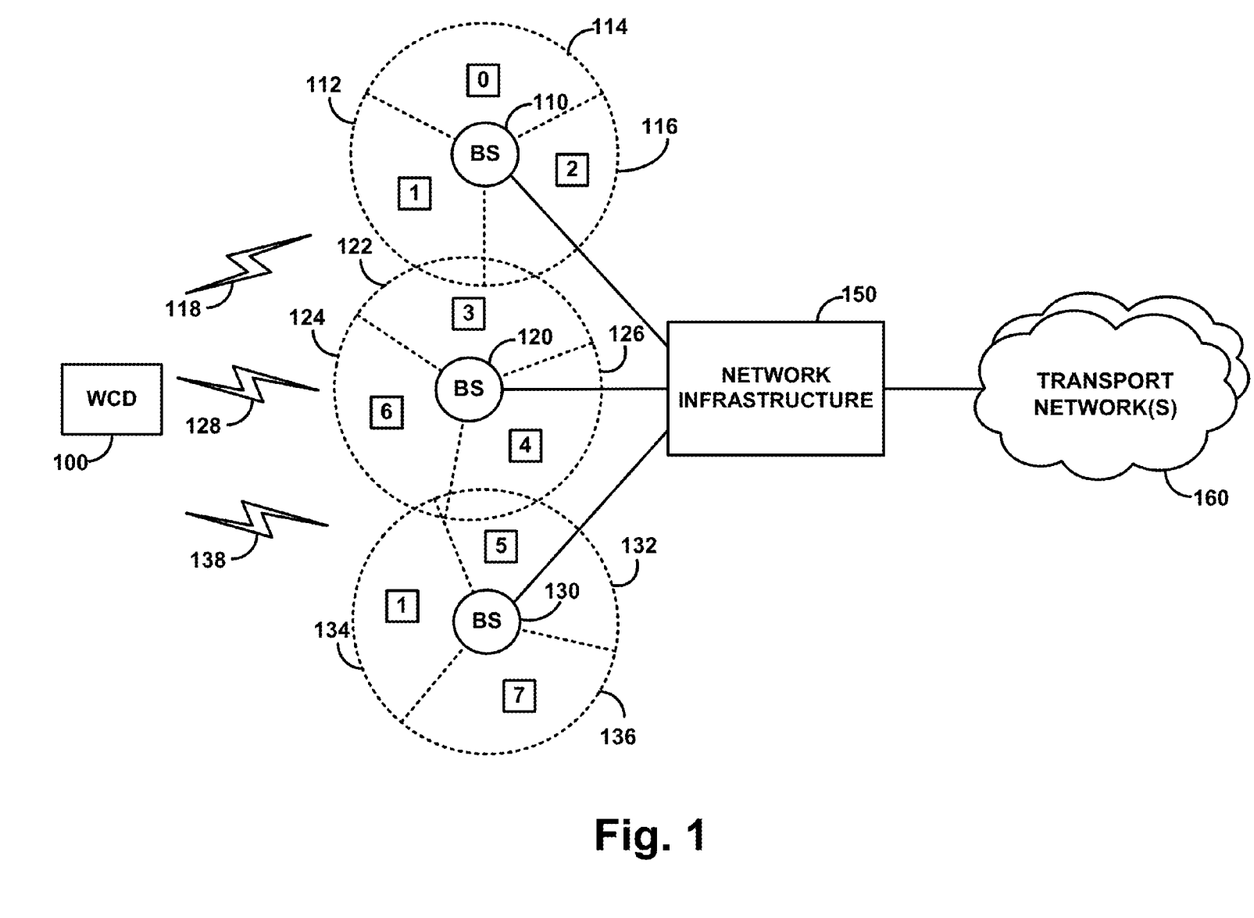
FIG. 1 is a block diagram of a wireless communication system, in accordance with an example embodiment.

FIG. 1 is a block diagram of an example wireless communication system. In FIG. 1, each base station is shown radiating to define one or more wireless coverage areas, each of which may operate on a particular frequency band for instance. In particular, base station 110 is shown radiating to define wireless coverage areas 112, 114, and 116, base station 120 is shown radiating to define wireless coverage areas 122, 124, and 126, and base station 130 is shown radiating to define wireless coverage areas 132, 134, and 136.

The illustrated communication system may operate in accordance with a particular radio access technology such as code-division multiple access (CDMA) and/or Long Term Evolution (LTE). By way of example, the system may be an LTE RAN, in which case each base station may be an LTE eNodeB, and the supporting network infrastructure may include elements such as a mobility management entity (MME), serving gateway (SGW) and a packet data network gateway (PGW). As another example, the system may be a CDMA RAN, in which case each base station may be a CDMA base station known as a base transceiver station (BTS), and the supporting network infrastructure may include elements such as a base station controller (BSC), radio network controller (RNC), mobile switching center (MSC), and packet data serving node (PDSN). Other examples are possible as well.

FIG. 1 further depicts an example WCD 100 positioned in range of air interface communication with base station 110, base station 120, and base station 130. WCD 100 may receive wireless service from one or more of base station 110, 120, or 130 and may thereby communicate with various remote network entities or with other WCDs via network infrastructure 150 and perhaps via one or more transport networks 160.

In operation, each wireless coverage area in the example communication system may define an air interface. The air interface may include a forward-direction link (downlink) for carrying communications from the serving base station to served WCDs, and a reverse-direction link (uplink) for carrying communications from served WCDs to the serving base station. FIG. 1 shows air interfaces 118, 128, and 138 of wireless coverage areas 112, 124, and 134, respectively. Each of air interface 118, 128, and 138 may include a forward-direction link and a reverse-direction link for communicating with WCD 100. Depending on the radio access technology, these air interface links may take various forms and may define various channels for carrying particular data, such as signaling and bearer traffic for instance.

By way of example, each wireless coverage area may define a pilot channel or reference channel on which the base station may broadcast a pilot signal or reference signal. WCD 100 may detect these signals as indications of wireless coverage, and may measure these signals to determine wireless coverage strength. Further, each wireless coverage area may define one or more signaling channels that carry various overhead messages, such as system information blocks or the like, specifying characteristics and operational parameters of the wireless coverage area, and perhaps information related to other wireless coverage areas.

Each wireless coverage area may also have a respective wireless coverage area identifier, such as a Physical Cell ID (PCI) or a pseudo-noise (PN) offset. In FIG. 1, for instance, wireless coverage areas 112, 114, and 116 provided by base station 110 have identifiers 1, 0, and 2, respectively. Wireless coverage areas 122, 124, and 126 provided by base station 120 have identifiers 3, 6, and 4, respectively. Wireless coverage areas 132, 134, and 136 have identifiers 5, 1, and 7, respectively. Note that some identifiers may be reused between two or more base stations.

Each wireless coverage area identifier may be indicated to WCDs and other base stations by the pilot or reference signal of the respective wireless coverage area, or specified in another overhead broadcast message or signal. The wireless service provider may, for example, assign each wireless coverage area identifier when the wireless coverage area is installed. The wireless service provider may re-assign wireless coverage area identifiers on occasion, such as when additional wireless coverage areas are added to the network.

When a WCD first powers on or enters into the RAN's wireless coverage, the WCD may scan for pilot or reference signals and determine a signal strength for each detected signal (e.g., a received strength or signal-to-noise ratio). The WCD may determine a wireless coverage area providing the strongest pilot or reference signal, and may engage in a process to register with the network by transmitting an attach request (registration request) to the base station that is providing that signal. In one instance, WCD 100 may identify wireless coverage area 124 as providing the strongest pilot or reference signal and may then transmit an attach request to base station 120.

At the time of attachment or thereafter, a WCD may also engage in signaling with the base station to enter into a "connected" (or "active") mode. In the connected mode, the base station has provisioned a radio link connection for use by the WCD, over which the WCD can engage in bearer communication with the base station and thereby with various other entities. In that mode, for instance, the WCD may engage in packet data communications on the Internet and/or a voice call on the publicly-switched telephone network (PSTN). This configuration may be referred to as the WCD receiving wireless service from the base station, and/or the WCD using a traffic channel of the base station.

While in the connected mode, the WCD may then continue to regularly scan pilot or reference signals, from both the wireless coverage area serving the WCD and from various other wireless coverage areas. Alternatively or additionally, the base station may direct the WCD to engage in such scanning from time to time. As the WCD carries out this scanning, the WCD may thus again determine the signal strengths of various wireless coverage areas, and the identities of those wireless coverage areas. For example, while connected to wireless coverage area 124, WCD 100 may determine the signal strength of wireless coverage areas 112 and 134, among others.

Further, while in the connected mode, the WCD may from time to time transmit to its serving base station a measurement report that specifies the signal strength of each wireless coverage area detected by the WCD. In particular, the measurement report may specify each detected wireless coverage area (e.g., by wireless coverage area identifier) and the signal strength (e.g., reference signal receive strength, or signal-to-noise ratio) of the wireless coverage area as determined by the WCD. In practice, a given measurement report may thus include such information for the WCD's currently serving wireless coverage area and may also include such information for each of one or more other wireless coverage areas detected by the WCD.

If such a measurement report specifies a signal strength of another wireless coverage area, the base station or other network node may engage in a process to decide whether to trigger handover of the WCD to the other wireless coverage area (sometimes referred to as a target wireless coverage area). In general, this process may involve evaluating the reported signal strength of the other wireless coverage area to determine whether it is sufficiently strong to support the WCD, and/or whether it is sufficiently stronger than the reported signal strength of the serving wireless coverage area. Further, the process may involve consideration of other factors as well, such as base station load and backhaul capacity for instance.

If the serving base station decides to trigger handover of the WCD to a target wireless coverage area of another base station, the serving base station may then reference its neighbor relations table (NRT) of nearby wireless coverage areas. The NRT may include indicators (e.g., PCIs) of nearby wireless coverage areas. For each wireless coverage area in the NRT, the NRT may also include an address, such as an IP address, for the base station that defines the wireless coverage area. In this way, a base station or other RAN component, and/or a WCD, may be able to determine how to communicate with a base station that defines a target wireless coverage area.

For instance, the serving base station may find, in the NRT, a particular wireless coverage area having a matching identifier to the target wireless coverage area. Next, the serving base station may transmit to that other base station, either over a direct inter-base-station interface or through one or more other network entities, a handover request message that requests the other base station to provide service to the WCD via the target wireless coverage area. The handover request message may specify the target wireless coverage area using that wireless coverage area's identifier. The other base station may then engage in a handover preparation process to establish a radio link for the WCD, and the WCD may ultimately transition to be served by that other base station.

Wireless coverage area identifier conflict may interfere with the operations described above. Such a conflict may occur when nearby or neighboring wireless coverage areas are assigned the same identifier. To illustrate, consider an arrangement in which WCD 100 is receiving wireless service from wireless coverage area 124 provided by base station 120. Occasionally, WCD 100 may transmit a measurement report to base station 120. The measurement report may specify wireless coverage areas detected by WCD 100. For example, if WCD 100 detects wireless coverage areas 112 and 134, a measurement report transmitted by WCD 100 may include the identifiers of wireless coverage areas 112 and 134. However, the identifiers of wireless coverage areas 112 and 134 are conflicting because each wireless coverage area is identified by identifier 1, as shown. Moreover, the neighbor list of base station 120 may include two entries for wireless coverage area identifier 1 because base station 110 and base station 130 have both indicated wireless coverage area identifier 1 via a pilot or reference signal.

Therefore, when base station 120 receives the measurement report, confusion may result because the conflicting identifiers create ambiguity between wireless coverage areas 112 and 134. For example, if base station 120 decides to trigger handover to one of wireless coverage areas 112 or 134, base station 120 may then refer to its neighbor list and find two entries indicating coverage area identifier 1. Base station 120 may be then unable to determine whether to send a handover request message to base station 110 or to base station 130. Or, base station 120 may send a handover request message to base station 130 to reserve resources of wireless coverage area 134 when WCD 100 intended wireless coverage area 112. In that case, a handover of WCD 100 to base station 110 may fail because base station 110 may not have resources reserved for WCD 100.

Further, through this process, base station 130 may have unnecessarily reserved resources that are unused because WCD 100 will not hand over to base station 130. Such resources may include, for example, a radio link connection. Unnecessarily reserving resources is inefficient. For example, where an identifier conflict has caused a base station to unnecessarily reserve radio link connections, an incoming handover request to the base station may fail for lack of a radio link connection to allocate to the WCD that has requested handover. Identifier conflict may cause other issues within the communication system as well.

Figure 2:
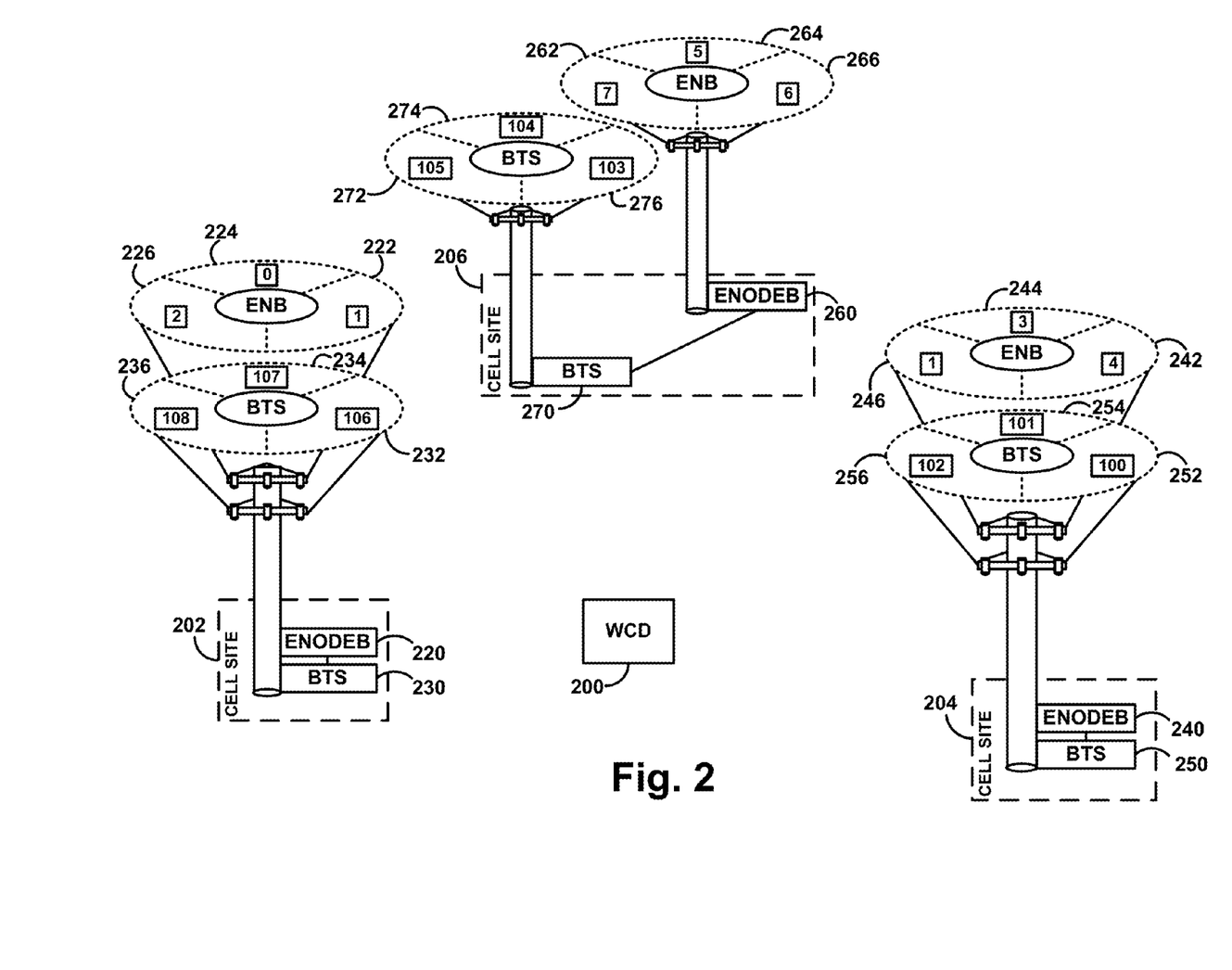
FIG. 2 is a block diagram of various types RAN components, in accordance with an example embodiment.

FIG. 2 is a simplified block diagram of an example communication system in which the present method can be implemented. The example communication system may provide wireless service within a market area. Within the example communication system, components of both an LTE RAN and a CDMA RAN are shown. While an LTE RAN and a CDMA RAN are shown for the purpose of example and explanation, the present method may be implemented using any one or more RANs. For example, the present method may be implemented in a market area in which a wireless service provider operates an LTE RAN and a GSM RAN. Moreover, the present method may be implemented using a RAN that operates according to one or more other radio access technologies that have yet to be developed.

As shown in FIG. 2, the LTE RAN includes at least eNodeB 220, 240, and 260. ENodeB 220 radiates to provide LTE wireless coverage areas 222, 224, and 226, eNodeB 240 radiates to provide LTE wireless coverage areas 242, 244, and 246, and eNodeB 260 radiates to provide LTE wireless coverage areas 262, 264, and 266. Further, the LTE RAN may include additional components not shown such as the network infrastructure shown in FIG. 1.

The CDMA RAN includes at least base transceiver stations (BTS) 230, 250, and 270. BTS 230 radiates to provide CDMA wireless coverage areas 232, 234, and 236, BTS 250 radiates to provide CDMA wireless coverage areas 252, 254, and 256, and BTS 270 radiates to provide CDMA wireless coverage areas 272, 274, and 276. Further, the CDMA RAN may include additional components not shown.

WCD 200 may operate within the range of these base stations. To receive wireless service, WCD 200 may engage in air interface communication with one or more of eNodeB 220, 240, and 260 of the LTE RAN. WCD 200 may also engage in air interface communication with one or more of BTS 230, 250, and 270 of the CDMA RAN. Air interface communication with components of the LTE RAN may occur concurrently with air interface communication with components of the CDMA RAN, or may occur separately.

Components of a communication system may be co-located and/or integrated together in various ways. For example, as a wireless service provider builds out an LTE RAN in the same market area as a CDMA RAN, LTE eNodeBs may be co-located with CDMA BTSs. For instance, in FIG. 2, eNodeBs of the LTE RAN are shown co-located with BTSs of the CDMA RAN at cell sites. Particularly, eNodeB 220 and BTS 230 are co-located at cell site 202 and share the same tower structure, as shown. ENodeB 240 and BTS 250 are co-located at cell site 204 and also share the same tower structure. ENodeB 260 and BTS 270 are co-located at cell site 204 and are shown having separate tower structures. Further, pairs of co-located base stations, such as eNodeB 220 and BTS 230, may share additional infrastructure, such as network infrastructure 150 as shown in FIG. 1.

In general, the depictions of FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present invention.

Moreover, the arrangement of the depicted wireless communication system, and the processes described herein, are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. Example Computing Device

Figure 3:
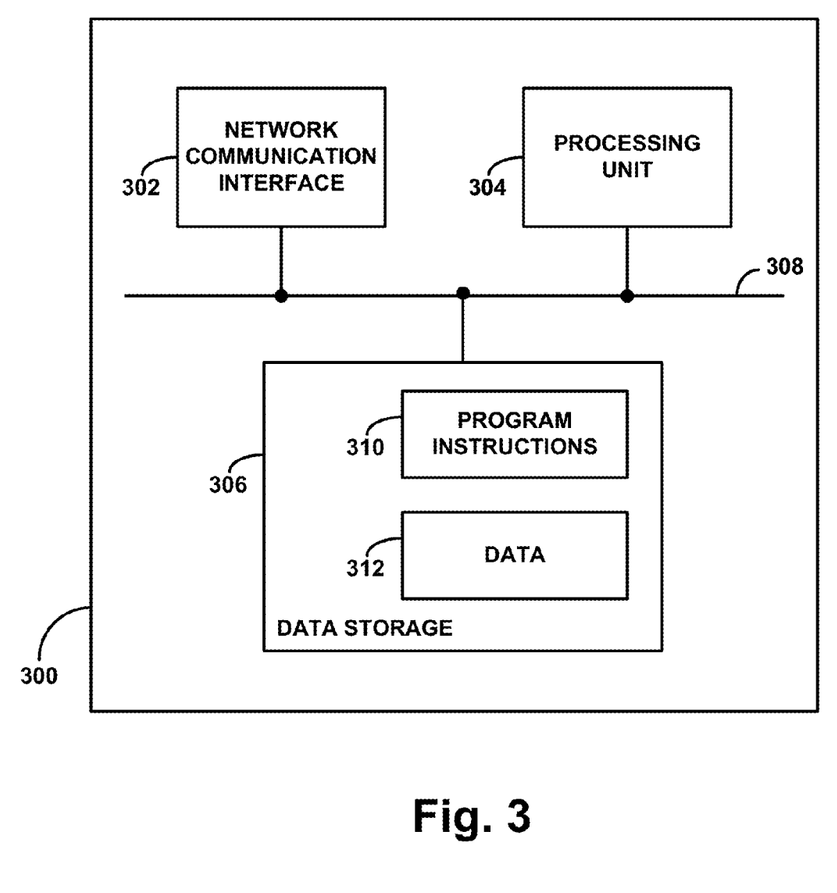
FIG. 3 is a block diagram of a computing device, in accordance with an example embodiment.

FIG. 3 is a block diagram of an example computing device 300. Computing device 300 could be a standalone general purpose or specialized computing device. Alternatively, computing device 300 could be a WCD or part of a RAN, such as a base station, serving gateway, packet gateway, or some other type of RAN component or computer.

As shown, computing device 300 includes a network communication interface 302, a processing unit 304, and data storage 306, all of which may be communicatively linked together by a system bus, network, or other connection mechanism 308. Computing device 300 may also include additional components, functions and/or interfaces not shown in FIG. 3, such as a keyboard, a mouse, a touch screen, a monitor, a printer, and/or one or more ports that interface with such devices, for example a universal serial bus (USB) or high-definition multimedia interface (HDMI) port.

Network communication interface 302 may support communication with various other network entities, such as any of the network entities shown in FIG. 1 or 2. As such, the interface 302 may include one or more network interface modules, such as Ethernet, Wifi, BLUETOOTH®, and/or wide-area wireless connection network interface modules, or any other type of wired and/or wireless communication interfaces.

Processing unit 304 may comprise one or more general purpose processors (e.g., microprocessors) and/or one or more special purpose processors (e.g., application specific integrated circuits, digital signal processors, and/or network processors). Data storage 306 may comprise one or more volatile and/or non-volatile non-transitory storage components, such as optical, magnetic, or flash storage, and may be integrated in whole or in part with processing unit 304.

As shown, data storage 306 may hold program instructions 310 and data 312. Program instructions 310 may be executable by processing unit 304 to carry out various functions described herein and/or depicted in the accompanying drawings. Data 312 could be any data that is generated, received, stored, or used in connection with carrying out such functions.

3. Example Tracking Area Arrangements and Wireless Coverage Area Identifier Assignment Procedures For purposes of illustration, this section provides examples of tracking area arrangements. This section also provides example procedures for assigning wireless coverage area identifiers to wireless coverage areas in these tracking areas so that the same wireless coverage area identifier is not assigned within the same tracking area or within any two adjacent tracking areas.

Figure 4:
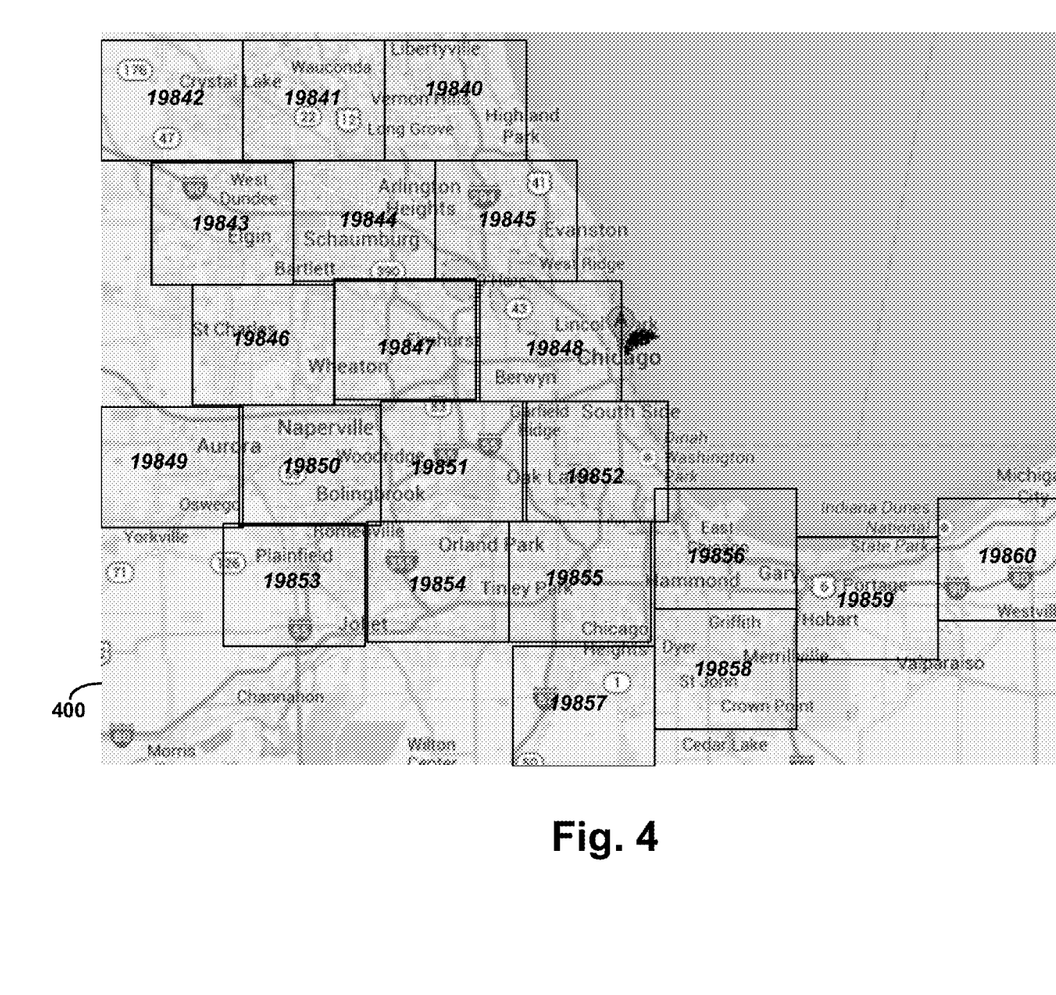
FIG. 4 is a set of tracking area groups, in accordance with an example embodiment.

FIG. 4 provides example arrangement 400 of tracking areas. Arrangement 400 is a hypothetical layout of tracking areas over the Chicago region of the United States. FIG. 4, however, is merely an illustrative embodiment, and other arrangements, in the Chicago area or any other area, may be possible.

Each tracking area in FIG. 4 is a represented by a numbered square encompassing some portion of the Chicago region. Each of these numbers may be a tracking area identifier, and may be unique throughout a wireless operator's network. Thus, a particular wireless operator may support dozens, hundreds, or thousands of such numbered tracking areas.

Each tracking area may include a group of geographically proximate wireless coverage areas. In some cases, the wireless coverage areas within a tracking area may provide contiguous wireless coverage in a particular geographic region. These wireless coverage areas may be defined by one or more base stations. Consequently, it may be appropriate to refer to a particular tracking area as containing an extent of base stations, and possibly an even greater extent of wireless coverage areas.

In some embodiments, the arrangement of tracking areas may be contiguous or substantively contiguous, as is shown in FIG. 4. Further, tracking area identifiers may be assigned to tracking areas in a geographically-defined sequence. As illustrated in arrangement 400, the sequence of tracking area identifiers is from 19840 to 19860, and these tracking area identifiers are assigned to tracking areas in a geographically numerical order. Notably, the sequence of tracking area identifiers begins in the top row of tracking areas, and continues row-by-row until tracking area identifiers are assigned to each tracking area in the region.

Thus, in some embodiments, the tracking area groups may be geographically distributed in an approximate row-and-column arrangement. Wireless coverage area identifiers may be assigned, one per wireless coverage area, to the tracking area groups in all columns of one row before the wireless coverage area identifiers are assigned to any columns of an adjacent row. Therefore, wireless coverage area identifiers may be assigned to tracking areas 19842, 19841, and 19840, then to tracking areas 19843, 19844, and 19845, then to tracking areas 19846, 19847, and 19848, and so on.

In other embodiments, the wireless coverage area identifiers may be assigned, one per wireless coverage area, to the tracking area groups in all rows of one column before the wireless coverage area identifiers are assigned to any rows of an adjacent column. Therefore, wireless coverage area identifiers may be assigned to tracking area 19849, then to tracking areas 19842, 19843, 19846, 19850, and 19853, then to tracking areas 19841, 19844, 19847, 19851, and 19854, and so on.

Additionally, the tracking areas of arrangement 400 may be divided into two distinct tracking area groups. Group 1 includes tracking areas 19840, 19841, 19842, 19843, 19844, 19845, 19846, 19847, 19848, 19849, and 19850. Group 2 includes tracking areas 19851, 19852, 19853, 19854, 19855, 19856, 19857, 19858, 19859, and 19860. Although arrangement 400 places 11 tracking areas in group 1 and 10 tracking areas in group 2, other numbers of tracking areas may be assigned to each tracking area group. Alternatively, an 11th tracking area of group 2 may exist and may be numbered 19861.

Regardless of what order in which wireless coverage area identifiers are assigned, the assignments may be may so that the same wireless coverage area identifier is not assigned to any two wireless coverage areas in the same tracking area. The assignments may also be made so that the same wireless coverage area identifier is not assigned to any two wireless coverage areas in any adjacent tracking areas.

Figure 5:
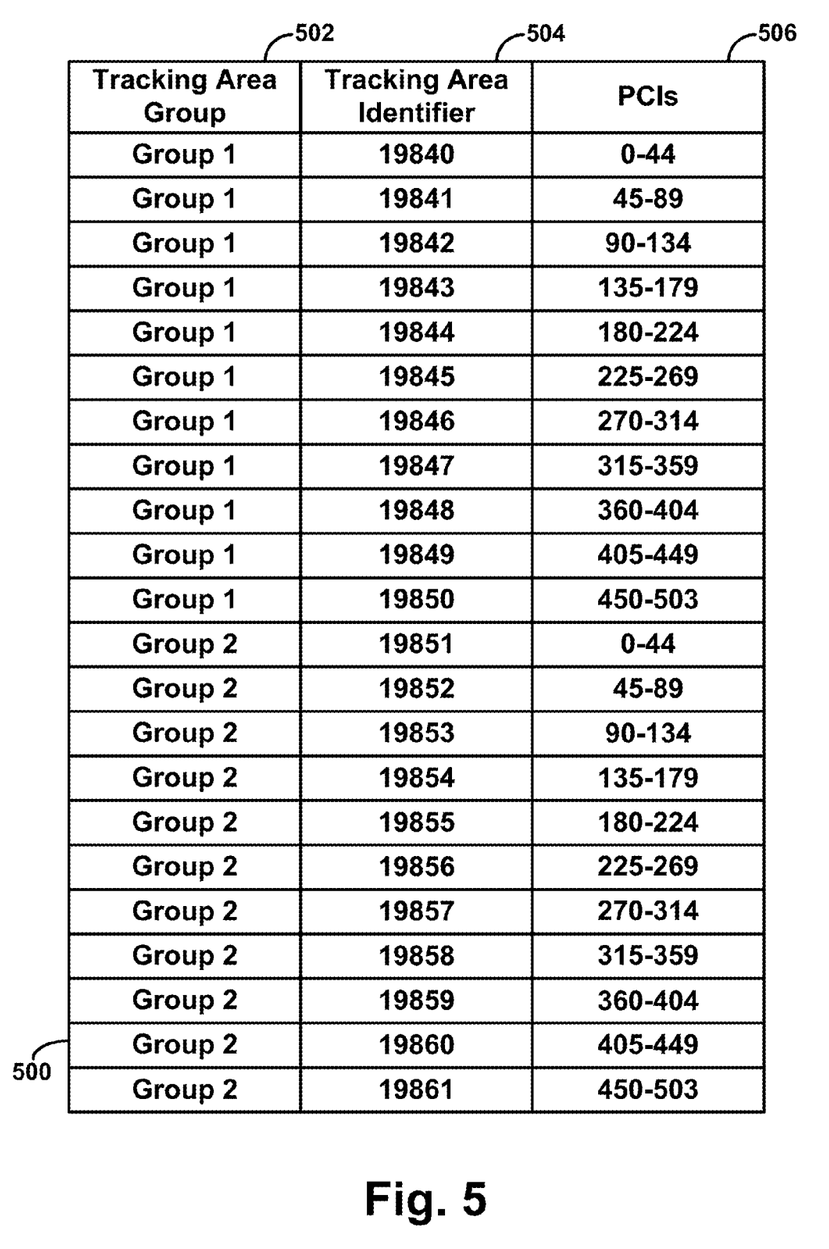
FIG. 5 is an assignment of wireless coverage area identifiers to tracking areas, in accordance with an example embodiment.

For instance, FIG. 5 illustrates an example assignment of wireless coverage area identifiers to tracking areas. Table 500 contains three columns. Column 502 indicates tracking area groups, which, in this example, are either group 1 or group 2. Column 504 indicates tracking areas by their respective tracking area identifiers. Column 506 indicates the wireless coverage area identifiers assigned to each tracking area group. When representing wireless coverage area identifiers, Table 500 assumes that the wireless technology is LTE, and that each wireless coverage area identifier is a PCI. Nonetheless, other wireless technologies and other types of wireless coverage area identifiers may be used with the embodiments herein.

Regardless, the PCIs may be numbered from 0 to 503, and numerically sequential sub-sequences of the PCIs may be assigned to tracking area group 1 in order of the respective tracking area identifiers. The same numerically sequential sub-sequences of the PCIs may be assigned to tracking area group 2 also in order of the respective tracking area identifiers.

For instance, in Table 500, there are 11 tracking areas per tracking area group. Thus, the PCI range of 0-503 may be divided into 11 contiguous groups. For group 1, the lowest 45 PCIs may be assigned to the tracking area with the lowest tracking area identifier in that group, the next highest 45 PCIs may be assigned to the tracking area with the next highest tracking area identifier, and so on. Similarly, for group 2, the lowest 45 PCIs may be assigned to the tracking area with the lowest tracking area identifier in that group, the next highest 45 PCIs may be assigned to the tracking area with the next highest tracking area identifier, and so on.

Even though up to 45 PCIs may be assigned to some tracking areas, not all of these PCIs need to be immediately assigned to wireless coverage areas. Thus, for example, if a particular tracking area only contains 40 wireless coverage areas, 5 PCIs assigned to that tracking area might not be assigned to wireless coverage areas. This allows wireless coverage areas to be added to tracking areas without requiring reassignment of PCIs between tracking areas.

The embodiments illustrated in FIGS. 4 and 5 are for purposes of example. There may be other ways of assigning wireless coverage area identifiers to tracking areas such that wireless coverage area identifier conflicts during handover are avoided. Further, some embodiments may use different extents and types of tracking area identifiers and wireless coverage area identifiers.

In some cases, the embodiments herein may facilitate automated provisioning of wireless coverage area identifiers to wireless coverage areas. In some networks, wireless coverage area identifiers are manually assigned and configured in base stations. In order to avoid or enhance this error-prone procedure, the methods, devices, and systems herein may automatically assign wireless coverage area identifiers to wireless coverage areas and then transmit these assignments to base stations. In this way, base station provisioning may occur more expeditiously and with greater accuracy.

4. Example Operations

Figure 6:
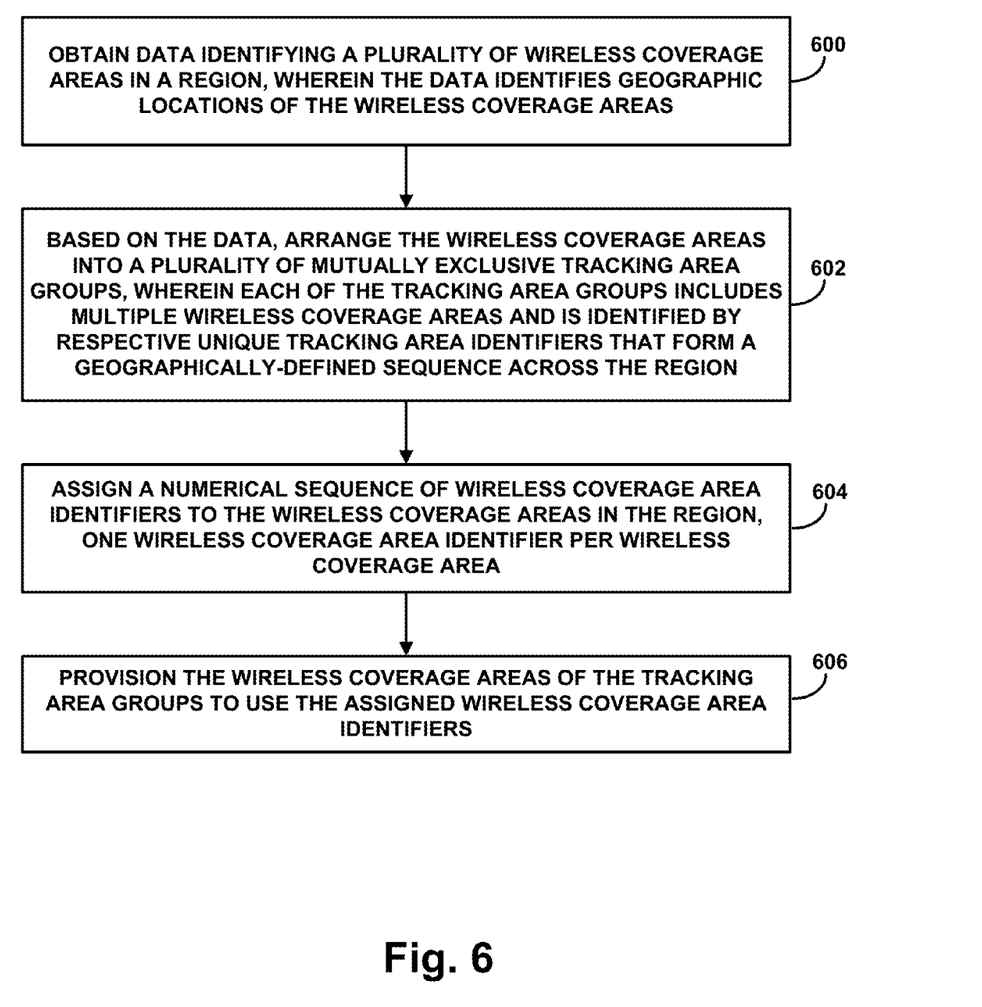
FIG. 6 is a flow chart, in accordance with an example embodiment.
Figure 7:
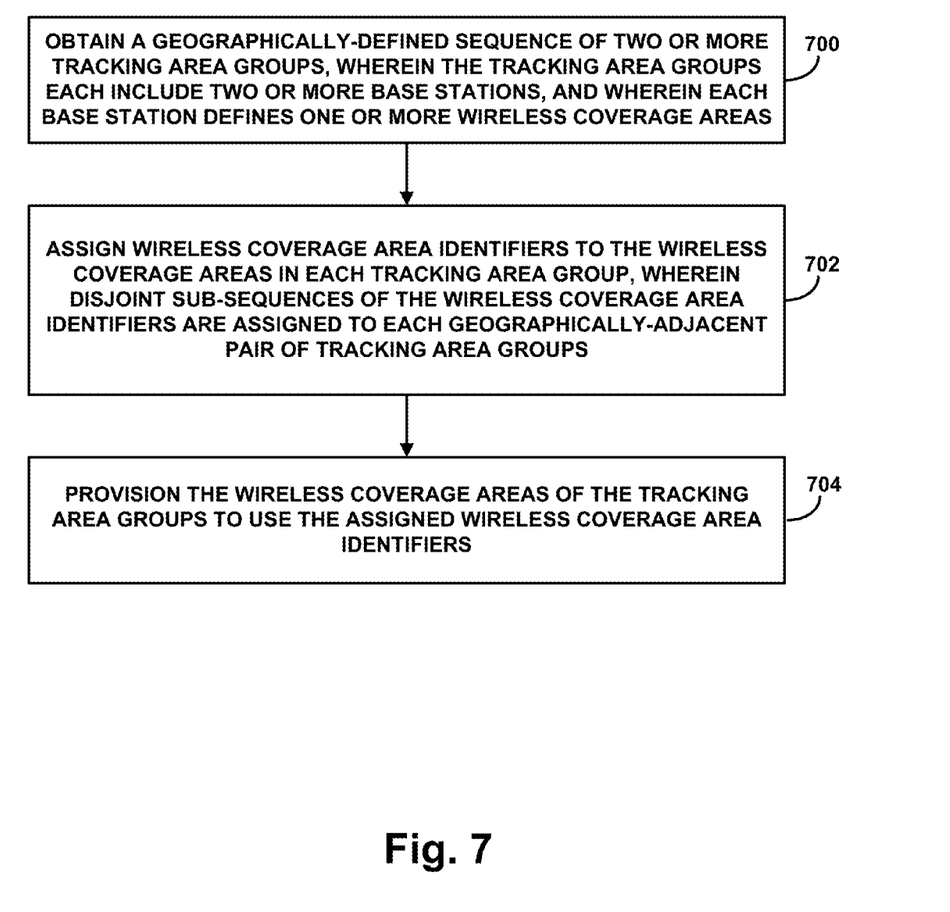
FIG. 7 is another flow chart, in accordance with an example embodiment.

FIGS. 6 and 7 are flow charts in accordance with example embodiments. The operations of these flow charts may be carried out by one or more computing devices, such as computing device 300.

At block 600 of FIG. 6, data identifying a plurality of wireless coverage areas in a region may be obtained. The data may identify geographic locations of the wireless coverage areas. In some cases, the data may include latitude and longitude, GPS coordinates, and/or other mechanisms for representing the geographical locations.

At block 602, possibly based on the data, the wireless coverage areas may be arranged into a plurality of mutually exclusive tracking area groups. Each of the tracking area groups may include multiple wireless coverage areas and may be identified by respective unique tracking area identifiers. The tracking area groups, as indexed by their identifiers, may form a geographically-defined sequence across the region. This geographically-defined sequence may be non-repeating.

At block 604, a numerical sequence of wireless coverage area identifiers may be assigned to the wireless coverage areas in the region, one wireless coverage area identifier per wireless coverage area. Assigning the numerical sequence of wireless coverage area identifiers may include (i) assigning numerically sequential sub-sequences of the wireless coverage area identifiers to a first proper subset of the tracking area groups taken in order of the geographically-defined sequence, and (ii) after exhausting assignment of the numerically sequential sub-sequences of the wireless coverage area identifiers, assigning the numerically sequential sub-sequences of the wireless coverage area identifiers to a second proper subset of the tracking area groups taken in continued order of the geographically-defined sequence. The numerically sequential sub-sequences may be non-repeating.

At block 606, the wireless coverage areas of the tracking area groups may be provisioned to use the assigned wireless coverage area identifiers. Base stations may define the wireless coverage areas, and provisioning the wireless coverage areas of the tracking area groups to use the assigned wireless coverage area identifiers may involve transmitting the assigned wireless coverage area identifiers to the base stations.

In some embodiments, assigning the numerical sequence of wireless coverage area identifiers to the wireless coverage areas in the region may involve arranging the geographically-defined sequence of tracking area groups so that a particular wireless coverage area identifier is not assigned to any two geographically-adjacent tracking area groups. Alternatively or additionally, a particular wireless coverage area identifier may be assigned to a first wireless tracking area group of the first proper subset of the tracking area groups. The particular wireless coverage area identifier may also be assigned to a second wireless tracking area group of the second proper subset of the tracking area groups. The first wireless tracking area group and the second tracking area group might not be geographically adjacent to one another.

In additional embodiments, the tracking area groups may be geographically distributed in an approximate row-and-column arrangement. The numerically sequential sub-sequences of wireless coverage area identifiers may be assigned to the tracking area groups in all columns of one row before the numerically sequential sub-sequences of wireless coverage area identifiers are assigned to any columns of an adjacent row. Alternatively, the numerically sequential sub-sequences of wireless coverage area identifiers may be assigned to the tracking area groups in all rows of one column before the numerically sequential sub-sequences of wireless coverage area identifiers are assigned to any rows of an adjacent column.

As one possible example, the numerical sequence of wireless coverage area identifiers may consist of approximately 500 wireless coverage area identifiers, and the first and second proper subsets of tracking area groups may each include approximately 11 tracking area groups. Each of the approximately 500 wireless coverage area identifiers may be assigned exactly once in the first proper subset of tracking area groups, and each of the approximately 500 wireless coverage area identifiers may be assigned exactly once in the second proper subset of tracking area groups.

Herein, the term "approximately" may mean that the actual number of wireless coverage area identifiers and tracking area groups are within a certain range (e.g., 1, 5, 10, 50, 100, etc.) or percentage (e.g., 1%, 10%, 20%, etc.) of 500 and 11, respectively.

At block 700 of FIG. 7, a geographically-defined sequence of two or more tracking area groups may be defined. The tracking area groups may each include two or more base stations, and each base station may define one or more wireless coverage areas.

At block 702, wireless coverage area identifiers may be assigned to the wireless coverage areas in each tracking area group. Disjoint sub-sequences of the wireless coverage area identifiers may be assigned to each geographically-adjacent pair of tracking area groups. The disjoint sub-sequences may be non-repeating.

At block 704, the wireless coverage areas of the tracking area groups may be provisioned to use the assigned wireless coverage area identifiers. Base stations may define the wireless coverage areas, and provisioning the wireless coverage areas of the tracking area groups to use the assigned wireless coverage area identifiers may involve transmitting the assigned wireless coverage area identifiers to the appropriate base stations.

In additional embodiments, the tracking area groups may be geographically distributed in an approximate row-and-column arrangement. Numerically sequential sub-sequences of wireless coverage area identifiers may be assigned to the tracking area groups in all columns of one row before the numerically sequential sub-sequences of wireless coverage area identifiers are assigned to any columns of an adjacent row. Alternatively, numerically sequential sub-sequences of wireless coverage area identifiers may be assigned to the tracking area groups in all rows of one column before the numerically sequential sub-sequences of wireless coverage area identifiers are assigned to any rows of an adjacent column.

As one possible example, the numerical sequence of wireless coverage area identifiers may consist of approximately 500 wireless coverage area identifiers, and the first and second proper subsets of tracking area groups may each include approximately 11 tracking area groups. Each of the approximately 500 wireless coverage area identifiers may be assigned exactly once in the first proper subset of tracking area groups, and each of the approximately 500 wireless coverage area identifiers may be assigned exactly once in the second proper subset of tracking area groups.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    obtaining, at a computing device, data identifying a plurality of wireless coverage areas in a region, wherein the data identifies geographic locations of the wireless coverage areas;
    based on the data, arranging the wireless coverage areas into a plurality of tracking area groups, wherein the tracking area groups define disjoint sets of tracking areas, the tracking areas identified by respective unique tracking area identifiers and each including multiple wireless coverage areas, and wherein the respective unique tracking area identifiers form a geographically-defined sequence of tracking areas across the region;
    assigning a numerical sequence of wireless coverage area identifiers to the wireless coverage areas in the region, one wireless coverage area identifier per wireless coverage area, wherein assigning the numerical sequence of wireless coverage area identifiers includes (i) assigning numerically sequential sub-sequences of the wireless coverage area identifiers to tracking areas in a first tracking area group taken in order of the geographically-defined sequence of tracking areas, and (ii) after exhausting assignment of the numerically sequential sub-sequences of the wireless coverage area identifiers, assigning the numerically sequential sub-sequences of the wireless coverage area identifiers to tracking areas in a second tracking area group taken in continued order of the geographically-defined sequence of tracking areas, such that (a) the wireless coverage area identifiers are assigned at most once to any particular tracking area group, and (b) at least some of the wireless coverage area identifiers are assigned to multiple tracking area groups; and
    provisioning the wireless coverage areas of the tracking area groups to use the assigned wireless coverage area identifiers.

2. The method of claim 1, wherein assigning the numerical sequence of wireless coverage area identifiers to the wireless coverage areas in the region comprises:
    arranging the geographically-defined sequence of tracking area groups so that a particular wireless coverage area identifier is not assigned to any two geographically-adjacent tracking area groups.

3. The method of claim 1, wherein assigning the numerical sequence of wireless coverage area identifiers to the wireless coverage areas in the region comprises:
    assigning a particular wireless coverage area identifier to a first wireless tracking area; and
    assigning the particular wireless coverage area identifier to a second wireless tracking area, wherein the first wireless tracking area and the second tracking area are not geographically adjacent to one another.

4. The method of claim 1, wherein the tracking area groups are geographically distributed in an approximate row-and-column arrangement, and wherein the numerically sequential sub-sequences of wireless coverage area identifiers are assigned to the tracking area groups in all columns of one row before the numerically sequential sub-sequences of wireless coverage area identifiers are assigned to any columns of an adjacent row.

5. The method of claim 1, wherein the tracking area groups are geographically distributed in an approximate row-and-column arrangement, and wherein the numerically sequential sub-sequences of wireless coverage area identifiers are assigned to the tracking area groups in all rows of one column before the numerically sequential sub-sequences of wireless coverage area identifiers are assigned to any rows of an adjacent column.

6. The method of claim 1, wherein base stations define the wireless coverage areas, and wherein provisioning the wireless coverage areas of the tracking area groups to use the assigned wireless coverage area identifiers comprises:
    transmitting the assigned wireless coverage area identifiers to the base stations.

7. The method of claim 1, wherein the numerical sequence of wireless coverage area identifiers comprises approximately 500 wireless coverage area identifiers, and wherein the first and second tracking area groups each include approximately 11 tracking areas.

8. The method of claim 7, wherein each of the approximately 500 wireless coverage area identifiers is assigned exactly once in the first tracking area group, and wherein each of the approximately 500 wireless coverage area identifiers is assigned exactly once in the second tracking area group.

9. An article of manufacture including a non-transitory computer-readable medium, having stored thereon program instructions that, upon execution by a computing device, cause the computing device to perform operations comprising:
    obtaining data identifying a plurality of wireless coverage areas in a region, wherein the data identifies geographic locations of the wireless coverage areas;
    based on the data, arranging the wireless coverage areas into a plurality of tracking area groups, wherein the tracking area groups define disjoint sets of tracking areas, the tracking areas identified by respective unique tracking area identifiers and each including multiple wireless coverage areas, and wherein the respective unique tracking area identifiers form a geographically-defined sequence of tracking areas across the region;

assigning a numerical sequence of wireless coverage area identifiers to the wireless coverage areas in the region, one wireless coverage area identifier per wireless coverage area, wherein assigning the numerical sequence of wireless coverage area identifiers includes (i) assigning numerically sequential sub-sequences of the wireless coverage area identifiers to tracking areas in a first tracking area group taken in order of the geographically-defined sequence of tracking areas, and (ii) after exhausting assignment of the numerically sequential sub-sequences of the wireless coverage area identifiers, assigning the numerically sequential sub-sequences of the wireless coverage area identifiers to tracking areas in a second tracking area group taken in continued order of the geographically-defined sequence of tracking areas, such that (a) the wireless coverage area identifiers are assigned at most once to any particular tracking area group, and (b) at least some of the wireless coverage area identifiers are assigned to multiple tracking area groups; and provisioning the wireless coverage areas of the tracking area groups to use the assigned wireless coverage area identifiers.

10. The article of manufacture of claim 9, wherein assigning the numerical sequence of wireless coverage area identifiers to the wireless coverage areas in the region comprises:

arranging the geographically-defined sequence of tracking area groups so that a particular wireless coverage area identifier is not assigned to any two geographically-adjacent tracking area groups.

11. The article of manufacture of claim 9, wherein assigning the numerical sequence of wireless coverage area identifiers to the wireless coverage areas in the region comprises:

assigning a particular wireless coverage area identifier to a first wireless tracking area; and assigning the particular wireless coverage area identifier to a second wireless tracking area, wherein the first wireless tracking area and the second tracking area are not geographically adjacent to one another.

12. The article of manufacture of claim 9, wherein the tracking area groups are geographically distributed in an approximate row-and-column arrangement, and wherein the numerically sequential sub-sequences of wireless coverage area identifiers are assigned to the tracking area groups in all columns of one row before the numerically sequential sub-sequences of wireless coverage area identifiers are assigned to any columns of an adjacent row.

13. The article of manufacture of claim 9, wherein the tracking area groups are geographically distributed in an approximate row-and-column arrangement, and wherein the numerically sequential sub-sequences of wireless coverage area identifiers are assigned to the tracking area groups in all rows of one column before the numerically sequential sub-sequences of wireless coverage area identifiers are assigned to any rows of an adjacent column.

14. The article of manufacture of claim 9, wherein base stations define the wireless coverage areas, and wherein provisioning the wireless coverage areas of the tracking area groups to use the assigned wireless coverage area identifiers comprises:

transmitting the assigned wireless coverage area identifiers to the base stations.

15. The article of manufacture of claim 9, wherein the numerical sequence of wireless coverage area identifiers comprises approximately 500 wireless coverage area identifiers, and wherein the first and second tracking area groups each include approximately 11 tracking areas.

16. The article of manufacture of claim 15, wherein each of the approximately 500 wireless coverage area identifiers is assigned exactly once in the first tracking area group, and wherein each of the approximately 500 wireless coverage area identifiers is assigned exactly once in the second tracking area group.

17. A method comprising:

obtaining a geographically-defined sequence of tracking areas in two or more tracking area groups, wherein the tracking areas each include two or more base stations, and wherein each base station defines one or more wireless coverage areas;

in order of the geographically-defined sequence of tracking areas, assigning, by a computing device, an entire numerical sequence of wireless coverage area identifiers to the wireless coverage areas of a first tracking area group;

in continued order of the geographically-defined sequence of tracking areas, assigning, by the computing device, at least part of the numerical sequence of wireless coverage area identifiers to the wireless coverage areas of a second tracking area group, wherein disjoint sub-sequences of the wireless coverage area identifiers are assigned to each geographically-adjacent pair of tracking areas; and provisioning the wireless coverage areas of the tracking area groups to use the assigned wireless coverage area identifiers.

18. The method of claim 17, wherein the tracking area groups are geographically distributed in an approximate row-and-column arrangement, and wherein numerically sequential sub-sequences of the wireless coverage area identifiers are assigned to the tracking area groups in all columns of one row before the numerically sequential sub-sequences of the wireless coverage area identifiers are assigned to any columns of an adjacent row.

19. The method of claim 17, wherein the tracking area groups are geographically distributed in an approximate row-and-column arrangement, and wherein numerically sequential sub-sequences of the wireless coverage area identifiers are assigned to the tracking area groups in all rows of one column before the numerically sequential sub-sequences of wireless coverage area identifiers are assigned to any rows of an adjacent column.

20. The method of claim 17, wherein provisioning the wireless coverage areas of the tracking area groups to use the assigned wireless coverage area identifiers comprises:

transmitting the assigned wireless coverage area identifiers to the base stations.

* * * * *